UNITED STATES PATENT OFFICE.

LÉON FÉVAL AND JEAN DE LA FRESNAYE, OF PARIS, FRANCE.

TREATMENT OF CAOUTCHOUC, GUTTA-PERCHA, AND LIKE SUBSTANCES.

1,102,487. Specification of Letters Patent. Patented July 7, 1914.

No Drawing. Application filed August 11, 1913. Serial No. 784,252.

*To all whom it may concern:*

Be it known that we, LÉON FÉVAL and JEAN DE LA FRESNAYE, both citizens of the French Republic, and both residing at 2 Avenue St. Philibert, Paris, France, have invented certain new and useful Improvements in and Relating to the Treatment of Caoutchouc, Gutta-Percha, and like Substances, of which the following is a specification.

Our invention relates to the treatment of caoutchouc gutta percha and like substances.

It is well known that speaking generally, the market value of substances of the type above indicated, varies inversely as the amount of resin which they contain, for example, the caoutchoucs of Pará contain very little resin and have a much higher market value than resinous gums such as Jelutong, Almedina and the like, which contain a large proportion of resin.

The resin has hitherto been removed from resinous gums by the use of volatile solvents such as alcohol, acetone and the like or of mixtures of volatile solvents such as ethyl alcohol with ethyl acetate or methyl alcohol with methyl acetate or mixtures of all four solvents, or a mixture of alcohol and benzin and alcohol and sulfid of carbon. The use of these solvents is attended with difficulties and requires very large proportions of solvents compared to the quantities of gums to be purified, this proportion being on an average of one part of gum to six parts of solvents.

The object of our present invention is to provide an improved process by means of which the resins may be separated from substances of the type above indicated, in a more efficient, economical and expeditious manner than formerly.

Our invention consists in a process for treating substances of the type above indicated, in which castor oil is utilized as a solvent for the extraction of resin either alone or in conjunction with another solvent or mixture of solvents.

Our invention further consists in a process for treating substances of the type above indicated, in which the resin is extracted from the substances by the employment of castor oil as a solvent, and the remainder of the impurities together with the castor oil and resin adhering to the gum after extraction, is removed by means of alcohol, acetone or some similar substance.

Our invention also consists in a by-product of the above process containing resin or a combination of resin and castor oil.

Our invention further consists in the improved process and the by-product thereof to be hereinafter described.

It has been found that castor oil when heated up to 140–150° C. does not dissolve caoutchouc or gutta percha although it acts as an efficient solvent of resins. On the other hand, castor oil being perfectly soluble in such solvents as alcohol, acetone and the like, any part of the oil remaining in the purified gum may be easily removed by such substances. The above qualities render castor oil peculiarly applicable to the purification of caoutchouc, gutta percha and like substances.

We have utilized the above qualities of castor oil in the embodiment of a new process for the purification of caoutchouc, gutta percha and like substances, and we will now describe one example of how our invention may be carried into effect.

To 100 kilograms of Jelutong or Almedina or similar gum, or it may be Hankang gutta percha, 100 kilograms of castor oil is added. The mixture is then placed in an open or closed apparatus, and heated to a suitable temperature for allowing the water contained in the gum to be evaporated. Where this operation takes place in a closed vessel, the pressure therein may be reduced below atmospheric pressure, and the evaporation of the water takes place at a lower temperature than in the case where an open vessel is employed. The resin in the material under treatment dissolves in the castor oil, and when all the water has been evaporated, this part of the process is complete. The point at which all the water in the gum has been evaporated is easily recognized, as the color of the caoutchouc becomes translucid. The caoutchouc or gutta percha floating on the surface of the liquid is then removed, and may be passed either through a press or a drying machine of any suitable kind in order to remove the greater portion of the oil with which it is impregnated. The material is then removed from the press or drying machine and placed in an extraction apparatus of any known type, in which the last traces of oil are removed by means of alcohol, acetone or other suitable solvents. The process is now complete and the result is a pure product.

The advantages of our invention are as follows:—

1. The operation of removing the resin from the caoutchouc or other gum is effected with great rapidity, one hour being ample for this part of the process.

2. The washing of the caoutchouc or other gum after removal of the resins is much simplified by reason of the fact that the castor oil is easily soluble in alcohol, and the product formed by the castor oil, and the resin, assumes the properties of castor oil, and becomes as easily soluble in alcohol as the castor oil itself. Alcohol may be used instead of acetone, which is an important consideration from the standpoint of economy.

3. As all the resin is removed by the castor oil treatment and all the water contained in the gum has been evaporated, the final purification of the gum is greatly facilitated and the amount of alcohol or other solvent for the final purification materially diminished, while the size of the apparatus may be reduced.

4. The by-product containing castor oil and resin or resins is valuable in the manufacture of soap and in certain mixtures of waxes for waterproofing.

Instead of using castor oil alone as a solvent for the resin we may use a mixture of castor oil and alcohol, acetone or other suitable solvent or it may be a mixture of suitable solvents.

We wish it to be understood that we do not wish our invention to be restricted to the precise process indicated above by way of example, as it is evident that modifications may be made therein without departing beyond the scope of our invention.

Having now described our invention what we claim as new and desire to secure by Letters Patent is:—

1. A process for the treatment of gutta percha, caoutchouc and other resinous gums, consisting in removing the resin by the employment of castor oil as a solvent.

2. A process for the purification of gutta percha, caoutchouc and other resinous gums, consisting in removing the resin by the employment of castor oil as a solvent and removing the other impurities and adhering oil by the use of alcohol or acetone as solvents.

3. A process for the treatment of gutta percha, caoutchouc and other resinous gums, consisting in heating a mixture of the gum and castor oil to remove the resins, and removing the water by evaporation and the remainder of the impurities and adhering oil by alcohol or acetone.

In testimony whereof we have signed our names to this specification in the presence of two subscribing witnesses.

LÉON FÉVAL.
JEAN DE LA FRESNAYE.

Witnesses:
HANSON C. COXE,
JACK H. BAKER.